Jan. 2, 1951     I. M. ARCHER     2,536,249
MACHINE FOR PANNING BREAD AND LIKE DOUGHS
Filed Dec. 18, 1944     2 Sheets-Sheet 1
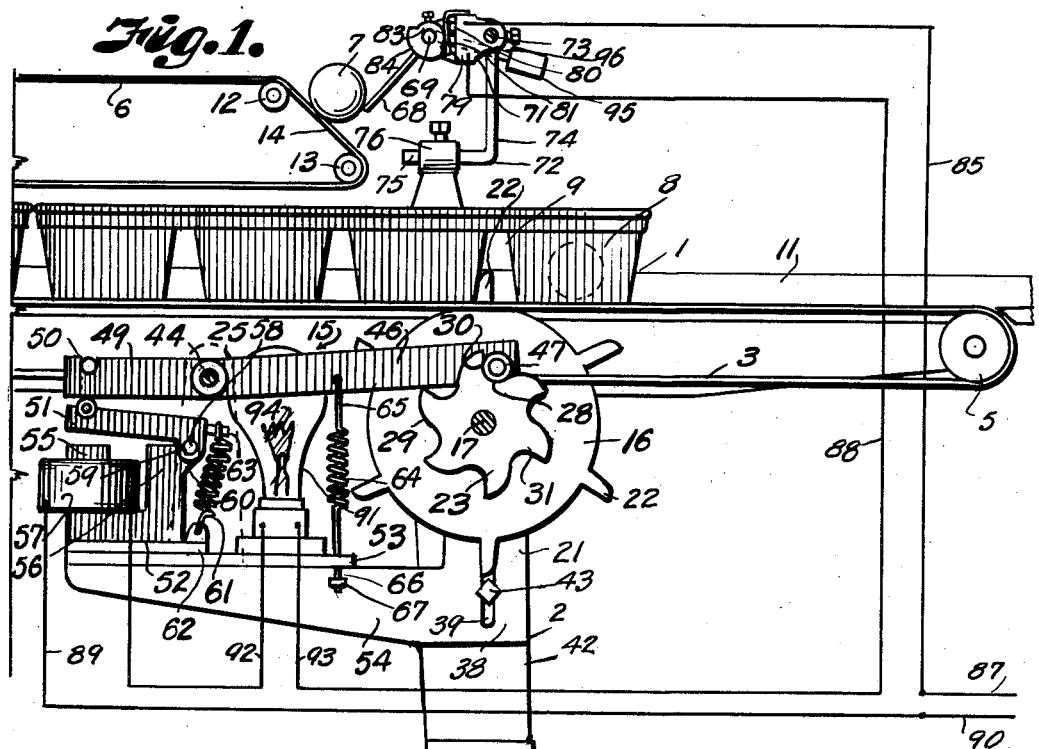
INVENTOR.
Irving M. Archer,
BY
Fishburn & Mullendore
ATTORNEYS Jan. 2, 1951          I. M. ARCHER          2,536,249
MACHINE FOR PANNING BREAD AND LIKE DOUGHS
Filed Dec. 18, 1944          2 Sheets-Sheet 2
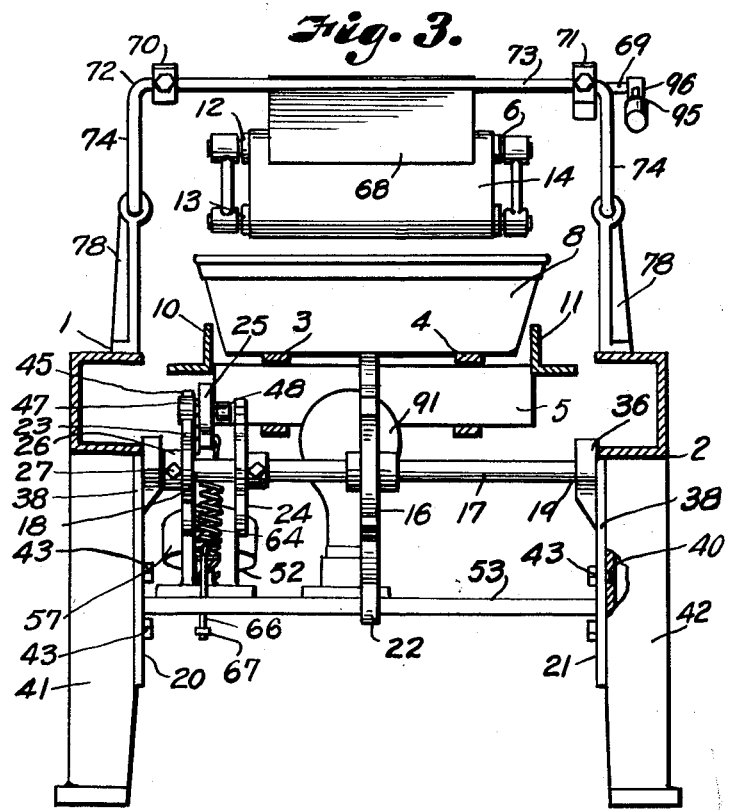
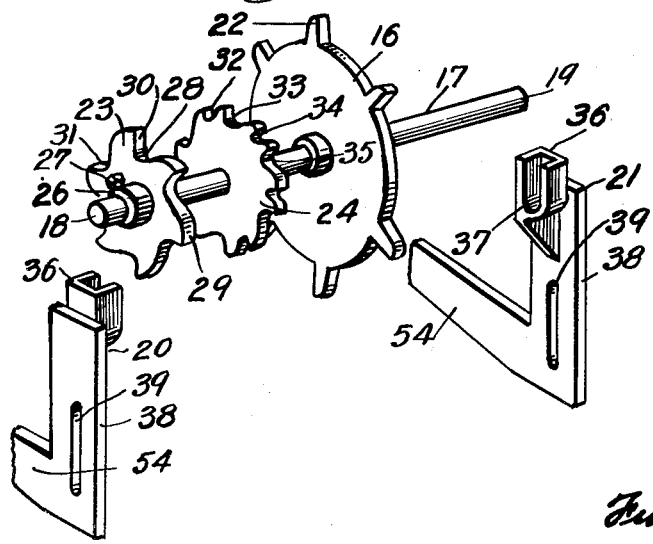
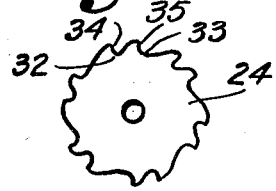
INVENTOR.
*Irving M. Archer*
BY
*Fishburn & Mullendore*
ATTORNEYS Patented Jan. 2, 1951

2,536,249

UNITED STATES PATENT OFFICE 2,536,249

MACHINE FOR PANNING BREAD AND LIKE DOUGHS

Irving M. Archer, Dallas, Tex., assignor to Campbell Taggart Research Corporation, Kansas City Mo., a corporation of Missouri Application December 18, 1944, Serial No. 568,628

1 Claim. (Cl. 226—2)

This invention relates to machines for panning bread and like doughs preparatory to baking and has for its principal object to provide a simple and efficient apparatus for automatically controlling movement of pans into receiving position responsive to delivery of shaped pieces of dough from a depositing mechanism.

Other objects of the invention are to provide for successive movement of the pans into positive registry with the pieces of dough being delivered by the depositing mechanism; to provide an apparatus which assures accurate placement of the dough in the pans; to provide a mechanism for stopping the pans in registry with the dough depositing mechanism; to provide means for electrically controlling the registering mechanism; to provide an electrical control that is of simple construction and adapted to be energized by any standard lighting circuit; and to provide an electrical control adapted to be energized in rapid sequence without overheating thereof.

Other objects of the invention are to provide an actuator for the control mechanism in the form of an electromagnet having ample power responsive to initial flow of the current and to provide means in circuit therewith for automatically reducing flow of current after the armature of the electromagnet has closed, and to provide a spring for assisting release of the armature and which is loaded during that portion of the movement just prior to contact with the pole pieces so that the spring does not act against the initial movement of the armature.

In accomplishing these and other objects of the invention hereinafter pointed out, I have provided improved structure, the preferred form of which is illustrated in the accompanying drawings wherein:

Fig. 1 is a side elevational view of a machine constructed in accordance with the present invention and showing a piece of dough in position to be deposited into a pan being retained in receiving position.

Fig. 2 is a similar view showing the pan control and registering mechanism in released position for permitting advance of the pans.

Fig. 3 is a cross section through the machine.

Fig. 4 is a perspective view of the registering and latching wheel assembly, together with the supporting brackets whereby the assembly is adapted to be readily removed and replaced with another assembly suitable to different size pans.

Fig. 5 is a side view of the latch wheel for effecting deposit of two pieces of dough in a pan as when baking twin or divided loaves of bread.

Referring more in detail to the drawings:

I designates an apparatus constructed in accordance with the present invention and which includes a supporting frame 2 carrying a pair of laterally spaced conveyer belts 3 and 4 operating over pulleys 5 at the respective ends of the frame 2 and adapted for delivering pans into receiving relation with a conveyer 6 which delivers pieces of dough 7 from a molding machine for deposit in the pans as they move into receiving position with respect to the discharge end of the conveyer 6. The pans 8 are of any standard type and may be individual or strapped together as desired. The pans are spaced apart incidental to the shape thereof as indicated at 9. The pans are retained in alignment on the conveyer belts by guide rails 10 and 11 suitably supported by the frame 2.

The delivery end of the dough depositing conveyer 6 is guided by pulleys 12 and 13 arranged relative to each other to provide an inclined run 14 down which the pieces of dough 7 slide into the pans as the pans are advanced by the conveyer belts.

In order to stop a pan in dough receiving position, it is necessary to provide a pan registering and controlling mechanism 15 now to be described.

In carrying out the present invention, pan registering and control mechanism 15 includes a substantially disk-like rotor 16 that is fixed to a shaft 17 having the ends 18 and 19 thereof rotatably mounted in bearing brackets 20 and 21 carried by the respective sides of the frame 2 as best shown in Fig. 3, the rotor being preferably positioned midway between the conveyer belts whereby projecting stops or fingers 22 on the periphery thereof are adapted to engage within the spaces 9 substantially in the manner of teeth of a gear wheel meshing with the spaces between the teeth of a rack, the rack being analogous to the pans. The fingers 22 are of a length and spacing to accommodate the pans therebetween and other rotors must be substituted when pans of different width or spacing are to be used.

Mounted on the shaft 17 are latch wheels 23 and 24 which are arranged on the respective sides of a detent supporting lever 25. The latch wheels 23 and 24 have hubs 26 adapted to be secured to the shaft 17 by set screws or the like 27 whereby the latch wheels are removable from operating relationship with the lever and secured by tightening the set screws so that the latch wheels are turned with the rotor. The latch wheel 23 has a periphery shaped to provide a plurality of dwells 28 corresponding in number with the fingers 22 on the rotor. Interposed between the dwells are cam portions 29 that extend from radial detent engaging faces 30 in rounding curves to join with curved portions 31 of a next adjacent dwell as best shown in Figs. 1 and 2.

The latch wheel 24 is of somewhat similar form with the exception that the dwells are arranged in pairs 32 and 33 with the pairs related to the fingers 22 on the rotor to provide detent engaging faces 34 and 35.

In order that the shaft 17, rotor, and latch wheels may be inserted and removed as a unit as when substituting a unit having latch wheels and finger spacing necessary for controlling pans of different widths and spacing, the brackets 20 and 21 have upwardly opening sockets 36 through which the ends of the shaft 17 are readily passed for support in bearing portions 37 in the bottoms thereof (Fig. 4). To position rotors of different diameter relative to the pans, the bearing brackets have plate portions 38 provided with slots 39 registering with threaded openings 40 in legs 41 and 42 of the frame to pass fastening devices such as bolts 43 (Fig. 3) whereby the brackets may be raised and lowered so that the periphery of a selected rotor will substantially register with the plane of the upper run of the conveyer belts. The detent lever 25 is pivotally mounted on a stud 44 carried by a bracket 45 (Fig. 3). The lever has one arm 46 extending to the latch wheels and terminates thereover for supporting laterally directed detents 47 and 48 on the respective sides thereof, the detents being shaped to seat within the dwells of the respective latch wheels. The lever also has a rearwardly extending arm 49 connected by a clevis 50 with the armature 51 of an electromagnet 52, the electromagnet being mounted on a shelf 53 which shelf also carries the bracket 45. The shelf in turn is carried by arms 54 projecting from the brackets 20 and 21 previously described.

The electromagnet includes interconnected pole pieces 55 and 56, one of which mounts a winding 57 and the other an armature 51, the armature being pivotally connected by a pin 58 extending through depending ears 59 on the armature and registering ears 60 on the pole pieces 56. The armature is normally retained in spaced position with respect to the pole pieces by a coil spring 61 having one end anchored to the base 62 of the magnet and the other end to a pin 63 projecting from the pivoted end of the armature. The spring preferably has only sufficient action to lift the armature from the pole pieces and supplement the weight of the arm 25 of the lever in retaining one of the detents in engagement with its latch wheel as later described.

In order to effect a slightly greater pull on the armature when circuit is broken through the winding, I provide a secondary spring 64 having one end 65 anchored to the arm 46 of the detent lever and having its other end 66 extending loosely through an opening in the shelf 53 and carrying a stop 67 on the underside of the shelf, the length of the spring being sufficient so that when a detent is in engagement with a dwell of a latch wheel, the stop 67 is spaced from the shelf as shown in Fig. 1 and the spring is contracted. Therefore, the magnet does not have to overcome the action in the spring during the initial attractive force of the pole pieces on the armature; however, during the final movement of the armature the stop 67 engages the underside of the shelf as shown in Fig. 2 and the spring is loaded so that when the current is broken in the magnet winding, the action in the secondary spring supplements that of the primary spring to overcome any magnetism remaining in the pole pieces. Therefore, the detent lever is quickly disengaged and automatically returned to latching engagement with one or the other of the latch wheels depending upon which of the wheels is being used as later described.

In order to effect release of the detent lever whenever a piece of dough 7 is in position to be deposited in a pan, I provide a vane 68 fixed to a shaft 69 that is adjustably supported on brackets 70 and 71 that are carried by the rod-like frame 72 which includes a cross bar portion 73 mounting brackets and leg portions 74 which terminate in foot portions 75 adjustable in sleeve portions 76 of brackets 78, the brackets 78 being fixed to the sides of the main frame 2. Carried by the bracket 71 is a switch 79 having a projecting push pin 80 adapted to be actuated to close circuit through the switch by a spring leaf 81 as shown in Fig. 1. Fixed on the shaft 69 in registry with the spring 82 is a cam 83 having a high lobe portion 84 arranged to press against the spring when the shaft is rocked through deflection of the vane 68 by a piece of dough discharged from the conveyer 6.

One terminal of the switch is connected by a conductor 85 with a service wire 87 while the other terminal of the switch is connected by a conductor 88 with one of the terminals of the electromagnet, the other terminal being connected by a conductor 89 with the other service wire 90 to complete an electric circuit through the magnet winding when the switch is closed.

In order that full line current may be supplied to the magnet for effecting initial pull on the armature and to prevent heating of the winding by the current after the initial surge has passed through the magnet winding, a resistance element 91 is connected into the conductor 88 by branch conductors 92 and 93, the resistance element illustrated being a lamp having a filament 94 which when cold offers little resistance to the flow of current in the electromagnet winding but as the lamp filament heats the electrical resistance increases to automatically reduce the current flow through the winding; however, by this time the armature has snapped to closed position and the current flow is ample to retain the armature.

It is thus obvious that a high initial surge of current is passed through the magnet to effect positive closure of the armature and that the current is automatically reduced by the rapidly increasing resistance of the heating filament to avoid excessive heating of the magnet coil.

The resistance element may be located in any convenient position but is shown as mounted adjacent the electromagnet on the shelf 53. The vane 68 is kept in circuit opening position by a counterbalance 95 mounted on an arm 96 extending from the shaft 69.

In operating a machine constructed and assembled as described, the pans 8 which may be in strapped units as shown are placed on the conveyer belts 3 and 4 in side to side relation so that they are carried under the conveyer belt 6 as shown in Fig. 1. The belts 3 and 4 being continuously driven, move the pans therealong until the foremost pan engages an upwardly projecting finger 22 of one of the rotors. When a single piece of dough is to be deposited in each pan 8, the latch wheel 24 is moved on the shaft so that the detent 48 is disengaged therefrom and the latch wheel 23 is placed in position and secured to the shaft 17 so that the detent 47 engages the dwells thereof. Therefore, the detent 47 of the lever will latch the rotor 23 in a position with one of the fingers 22 projecting in the path of the foremost pan to detain the pans on the belts while the belt is sliding under the bottoms thereof.

With the molding machine in operation, pieces of dough 7 are being delivered to the conveyer 6 so that when the first piece of dough reaches the discharge end thereof and slides down the inclined portion 14 of the belt it deflects the vane 68 to effect closure of the switch and effect current flow through the winding 57 of the electromagnet whereby the induced magnetism in the pole pieces draws the armature 51 thereagainst and rocks the detent lever 25 so that the detent 48 is lifted away from the latch wheel 23 whereupon the motive force acting on the pans by the moving belts starts movement of the pans to turn the rotor. By this time the piece of dough has dropped into the foremost pan and the weight 95 fixed to the shaft 69 returns the vane to normal position allowing the switch to open whereupon the springs 61 and 64 are effective in pressing the detent 47 against the cam portion 29 to exert a thrust on the latch wheel to bring the latch wheel into position so that the detent enters immediately following dwell portion 28 which movement also brings the succeeding finger 22 of the rotor 16 into the space 9 between the next adjacent pans and as the end of the first finger passes under the forward edge of the foremost pan the opposite side of the succeeding finger is engaged by the foremost side of the following pan. When the next piece of dough drops into the pan then registering with the discharge end of the conveyer 6, the abovementioned operations are repeated.

It is obvious that when the circuit to the winding of the electromagnet is closed the lamp filament 94 offers slight resistance to the current so that maximum current flows through the winding to exert a strong pull on the armature, loading the spring 61 and the final movement thereof loading the spring 64. As the filament heats the current is automatically reduced in the winding to prevent heating thereof. When the current is broken the action of both springs is ample to move the armature even though some effect of the magnetism may remain in the pole pieces.

When it is desired to deposit two pieces of dough in a pan, the latch wheel 23 is removed or moved out of position relative to the detent 47 and the latch wheel 24 is moved into position so that the detent 48 engages in the dwell 33 thereof. Therefore, when the electromagnet functions after depositing a piece of dough in the forward side of a pan, the detent works into the following dwell 32 so that the pan is advanced a distance to permit deposit of the next piece of dough alongside of the first deposited piece of dough. Upon the next action the pans are advanced to bring the foremost portion of the following pan into position to receive the next piece of dough. It is thus noted that with the use of latch wheel 24, two pieces of dough will be deposited in each pan.

From the foregoing it is obvious that I have provided a machine for automatically depositing dough in pans wherein the operations are positive to assure accurate placement of the dough in the pans as the pans are delivered into receiving position with the dough depositing conveyer.

What I claim and desire to secure by Letters Patent is:

A machine for panning dough and the like including a pair of continuously operatable laterally spaced endless conveyers having upper runs for carrying pans strapped together in spaced apart relation with the pans resting transversely on said runs and spanning the space therebetween, a wheel having radially projecting fingers spaced in accordance with the spaces between the pans, means for mounting said wheel below said upper runs of the conveyers for rotation in a vertical plane extending parallel with the direction of movement of the conveyers and with the fingers projecting above the upper runs and in position to be successively engaged by the pans when the pans are moved by said conveyers, means having latching connection with said wheel to stop rotation of said wheel for stopping movement of the pans by said upper runs of the conveyers, a conveyer for carrying pieces of dough and having a downwardly sloping terminal portion for discharging pieces of dough into said pans, a vane having pivotal support above the terminal portion and having a free edge extending in the direction of the sloping terminal portion of the conveyer to be in position for contact by the pieces of dough moving down the sloping terminal portion of the dough carrying conveyer, a rock member connected with the vane and adapted to pivot therewith, and a connection between the rock member and said latching means for releasing the wheel upon movement of said vane to free the pans for movement by said spaced conveyers.

IRVING M. ARCHER.

REFERENCES CITED

The following references are of record in the file of this patent:

UNITED STATES PATENTS

| Number | Name | Date |
|---|---|---|
| 123,490 | Little | Feb. 6, 1872 |
| 780,824 | Slater | Jan. 24, 1905 |
| 1,142,852 | Simon | June 15, 1915 |
| 1,165,362 | Ross | Dec. 21, 1915 |
| 1,281,579 | Johnson | Oct. 15, 1918 |
| 1,281,580 | Johnson | Oct. 15, 1918 |
| 1,312,640 | Mallinckrodt | Aug. 12, 1919 |
| 1,633,014 | Harber | June 21, 1927 |
| 1,667,991 | Russell | May 1, 1928 |
| 1,715,968 | Weber et al. | June 4, 1929 |
| 1,810,645 | Dieter | June 15, 1931 |
| 2,026,856 | Youngdahl | June 7, 1936 |
| 2,107,373 | Edwards | Feb. 8, 1938 |
| 2,155,594 | Hart | Apr. 25, 1939 |
| 2,324,312 | Meyer | July 13, 1943 |